United States Patent
D'Amora et al.

(10) Patent No.: US 7,136,077 B2
(45) Date of Patent: Nov. 14, 2006

(54) SYSTEM, METHOD, AND ARTICLE OF MANUFACTURE FOR SHADING COMPUTER GRAPHICS

(75) Inventors: Bruce D. D'Amora, New Milford, CT (US); Gabriel Taubin, Providence, RI (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 10/864,247

(22) Filed: Jun. 9, 2004

(65) Prior Publication Data

US 2005/0275659 A1 Dec. 15, 2005

(51) Int. Cl.
*G09G 5/02* (2006.01)

(52) U.S. Cl. .................. 345/601; 345/420; 345/426; 345/581; 345/582

(58) Field of Classification Search ........... 345/420, 345/426, 581, 582, 601
See application file for complete search history.

(56) References Cited

U.S. PATENT DOCUMENTS 6,850,243 B1 * 2/2005 Kilgariff et al. ............ 345/582

* cited by examiner

*Primary Examiner*—Kee M. Tung
*Assistant Examiner*—Tam Tran
(74) *Attorney, Agent, or Firm*—Rafael Perez-Pineiro (57) ABSTRACT

A computer system, method, and article of manufacture for shading graphical objects and/or displays is disclosed. A graphical geometric data structure has a plurality of vertex positions defining one or more polygons, typically triangles. In a preferred embodiment, the polygons define a wireframe representation of a geometric object. Each of the vertex positions is associated with one or more sets of vertex color information. A color table has one or more fill colors to be rendered (shaded) between two or more of the vertex positions on a rendering of the geometric object. These colors can uniformly vary between the vertices of the triangle over the entire surface. A substitute color is associated with each of the fill colors so that at least two of the fill colors are associated with the same substitute color.

25 Claims, 8 Drawing Sheets

SYSTEM, METHOD, AND ARTICLE OF MANUFACTURE FOR SHADING COMPUTER GRAPHICS

FIELD OF THE INVENTION

This invention relates to computer graphics. More specifically, the invention relates to shading computer graphical objects and/or displays, particularly in low memory devices.

BACKGROUND OF THE INVENTION

Graphical computer objects, particularly 1D, 2D or 3D graphics (graphical) objects, are most commonly stored in memory or in a file as a set of triangles with 3 coordinates (x, y, and z) representing the vertices of each triangle. The rendering and display of 1D, 2D or 3D graphics models results from the transformation and rendering of these triangles from a 1D, 2D (or 3D) object space to a 2D image space represented by the displays framebuffer. In the simplest case, these models are transformed and rendered as wireframe (lines) objects with a single color representing the wireframe lines. A more common approach is to render these models as filled polygons (triangles). The process of filling a triangle is called scan conversion and can be performed in various ways to achieve different visual effects. Generally, the different forms of filling a triangle fall into one of 3 categories. In the simplest case, each interior pixel (picture element) of the triangle in image space is identified and assigned the same color (R,G,B) value. The value is stored in the display framebuffer at the computed location. This is type of filling is called flat shading since there is no variation in the colors stored across the interior of the triangle. In other words there is 1 color per triangle. In another case, a pre-existing picture or pattern may be mapped across the interior of the triangle. This technique is known as texture mapping. A third case is smooth shading, where the color of the triangle interior varies from pixel to pixel. Smooth shading is usually performed by the algorithms such as Gouraud or Phong shading. In Gouraud shading a color is assigned to each vertex or the triangle and used to compute the rate of change of each color component (R, G, B) over the interior of the triangle. Phong shading differs slightly in that normal vectors are assigned to each vertex and are interpolated across the interior pixels of the triangle. A normal vector is a vertex attribute which relates to how light will be reflected when it strikes that vertex or the polygon that the vertex is part of. At each pixel location a new normal is computed and used in a lighting equation to compute a color at that pixel location. This is generally considered a more accurate form of shading a triangle although computationally much more expensive. In every form of smooth shading, there exists the probability of generating new colors, i.e. R,G,B values not represented by the original values attached to each vertex of the polygon. With limited display memory this becomes problematic. A more detailed explanation of computer graphics can be found in textbooks such as Computer Graphics: Principles and Practice by Fole,van Dam, Feiner, & Hughes, pp. 598–599,613,736–740 or Real-time Rendering by Moller and Haines, pp 14,68–69, 77, which are herein incorporated by reference in their entirety.

PROBLEMS WITH THE PRIOR ART

One key problem in the prior art is how to represent the color that is stored at each pixel location in the displays framebuffer when the framebuffer as constraints on the amount of memory that can be used to represent a color at each pixel location. More specifically, in any type of smooth shading many new colors can be generated as a result of the smooth shading process. In a typical 24-bit workstation or PC framebuffer, one would be able to represent 224 different colors. This is usually adequate, but in many applications such as Digital Content Creation (DCC) even 24-bits is not enough to represent the dynamic range of colors and framebuffer with 48-bits may be necessary. The problem becomes worse as one move from workstation/PC class computers to notebook or handheld computers such as PDA's and cell phones. These devices have very strict power requirements and display memory is the biggest drain on power. In fact, most low power devices such as cell phones have 8-bit framebuffer. An 8-bit framebuffer will only allow 256 colors to be displayed in any single display frame. The process of selected the best 256 colors to represent an image is called color quantization. This process is adequate if the application programmer knows ahead of time the colors in the source image to be displayed on the 8-bit display, but if the application is rendering lit, smooth shaded 3D models, new colors will be generated each display frame as the user interacts with the model changing its orientation, size, position, etc. If the optimal colors are not selected, the rendered images will exhibit artifacts such as Moire patterns or areas of the rendered image that show sudden transitions to black (0,0,0) or other shades inconsistent with neighboring pixels as colors fail to transition smoothly from one shade and intensity to another.

Color quantization can be performed using many algorithms, but is typically only done when all the colors of the source image have already been determined. This is not a real-time process. In order to deal with the real-time generation and display of smooth shaded images on a low power compute devices there have been several solutions all which require more framebuffer memory than is optimal for the power requirements of such devices.

Several low-power renderers have been proposed, but typically they avoid or minimize the color quantization problem by employing larger framebuffers. For example, Wee-Chiew Tan and Teresa Meng developed a low-power polygon renderer that utilized a 14-bit (5-5-4) framebuffer to minimize color loss. Chi-Weon Yoon, et al., developed a 160 mW Multimedia processor that utilized a 24-bit framebuffer to solve the problem of color quantization. Yong-Har Park et al. also developed a low power 3D rendering engine that also utilized a 24-bit framebuffer. These solutions all concentrate on managing the power of the rendering pipeline, rather than minimizing the size of the framebuffer and hence avoid the problem of image quantization to a large degree.

The references are herein incorporated by reference in their entirety.

ASPECTS OF THE INVENTION

An aspect of this invention is an improved system and method for shading computer graphics.

An aspect of this invention is an improved system and method for shading computer graphics in computers with reduced memory capacity.

An aspect of this invention is an improved system and method for shading computer graphics in multiple dimensions.

An aspect of this invention is an improved system and method for shading computer graphics that reduce color quantization.

An aspect of this invention is an improved system and method for shading computer graphical objects that are manipulated, e.g., in orientation, size, lighting, motion, and color.

SUMMARY OF THE INVENTION

The present invention is a computer system, method, and article of manufacture for shading graphical objects and/or displays. A graphical geometric data structure has a plurality of vertex positions defining one or more polygons, typically triangles. In a preferred embodiment, the polygons define a wireframe representation of a geometric object. Each of the vertex positions is associated with one or more sets of vertex color information. A Shade table has one or more fill colors to be rendered (shaded) between two or more of the vertex positions on a rendering of the geometric object. A substitute color is associated with each of the Shade table colors so that at least two of the fill colors are associated with the same substitute color.

BRIEF DESCRIPTION OF THE FIGURES

The foregoing and other objects, aspects, and advantages will be better understood from the following non limiting detailed description of preferred embodiments of the invention with reference to the drawings that include the following.

DETAILED DESCRIPTION OF THE INVENTION

One preferred embodiment of the present invention addresses the problem of real-time smooth shading on a low power device by employing the idea of a Shade table created by an off-line transcoder application that uses the original vertex colors assigned to the triangles that the model or geometric object, preferably a 3D model, is composed of to create a color table and a reverse look up shade table that can be used during the smooth shading process. The invention efficiently identifies the color in the color table that is nearest to the color generated during scan conversion. This technique is further enhanced to take into account additional shades that may be generated as a result of the lighting process or other changes in the rendering, e.g., changes in orientation, size, lighting, motion, and color. Colors for interior pixels at random locations within the triangle boundary can be selected and stored in the color table.

Figure 1:
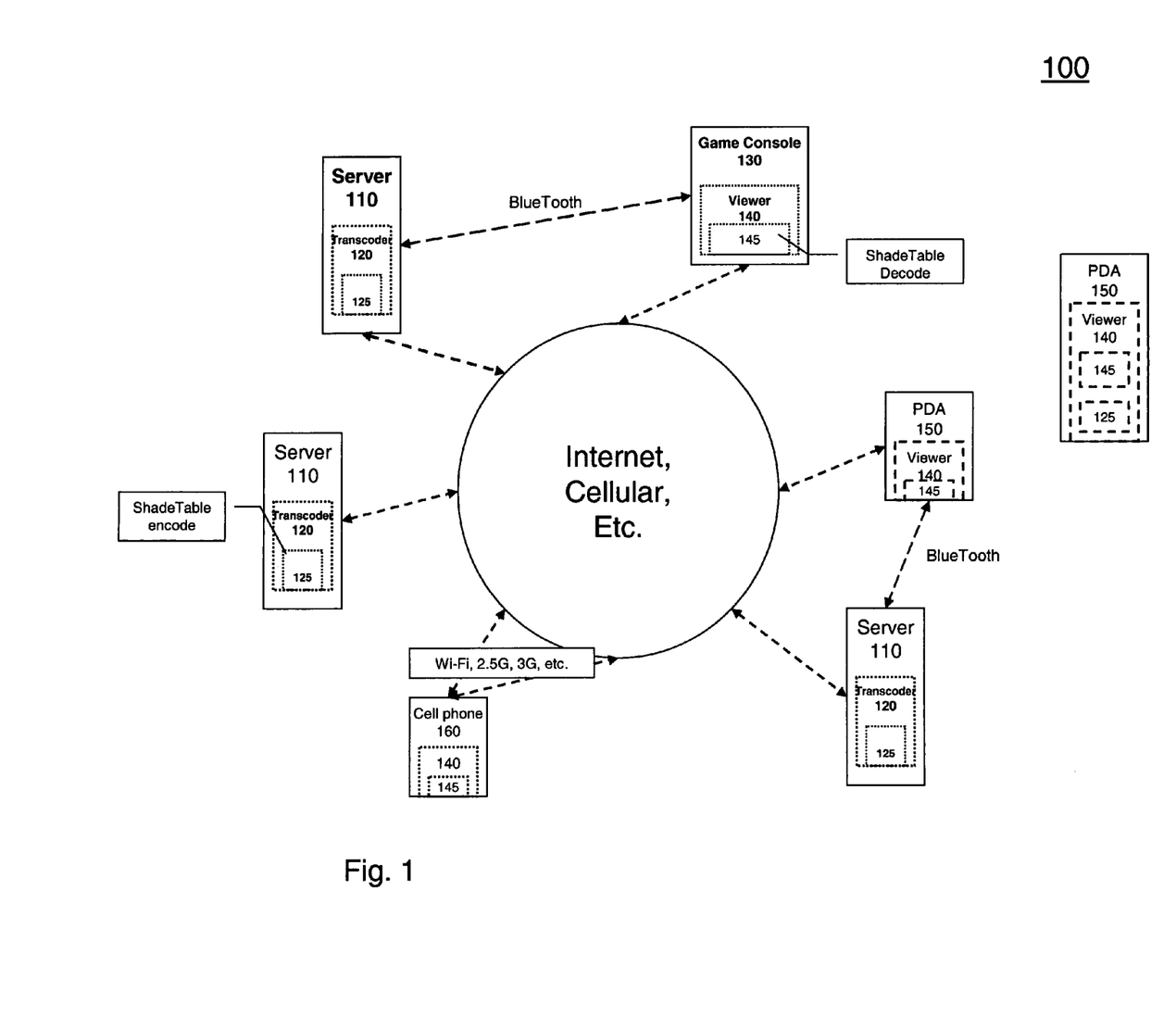
FIG. 1 is a block diagram of alternate preferred embodiments of the present invention used in a networking environment.

FIG. 1 describes several example system configurations in which this invention can be deployed. A Server, 110, can be utilized to execute the Transcoder application (see the description of FIG. 4, below), 120, that converts a standard 3D scene description file into a device optimized scene file that preferably includes a Shade table, 300 (created by process 125). This scene description file can be transferred via any known communication interface e.g., Ethernet, Bluetooth, telephone, serial/USB connection, internet, radio frequency, infrared, etc. to another general client device, such as any pervasive device, a game console, 130, PDA, 150, or Cell Phone, 160 for example. In one preferred embodiment, these devices execute a client parser process, 140 (described in FIG. 7, below). A client application running on a PDA or other low power handheld device executes the rendering pipeline/process, 145 (described in FIG. 8, below), allowing the user to interact with 3D models by rotating, translating, and scaling their position on the display surface by using a stylus, buttons or some other known or substitute form of user input device. FIG. 1 also shows a stand-alone version of a PDA, 150, which depicts the client parser process, 140, rendering pipeline, 145, and Shade table (300, 125).

Figure 4:
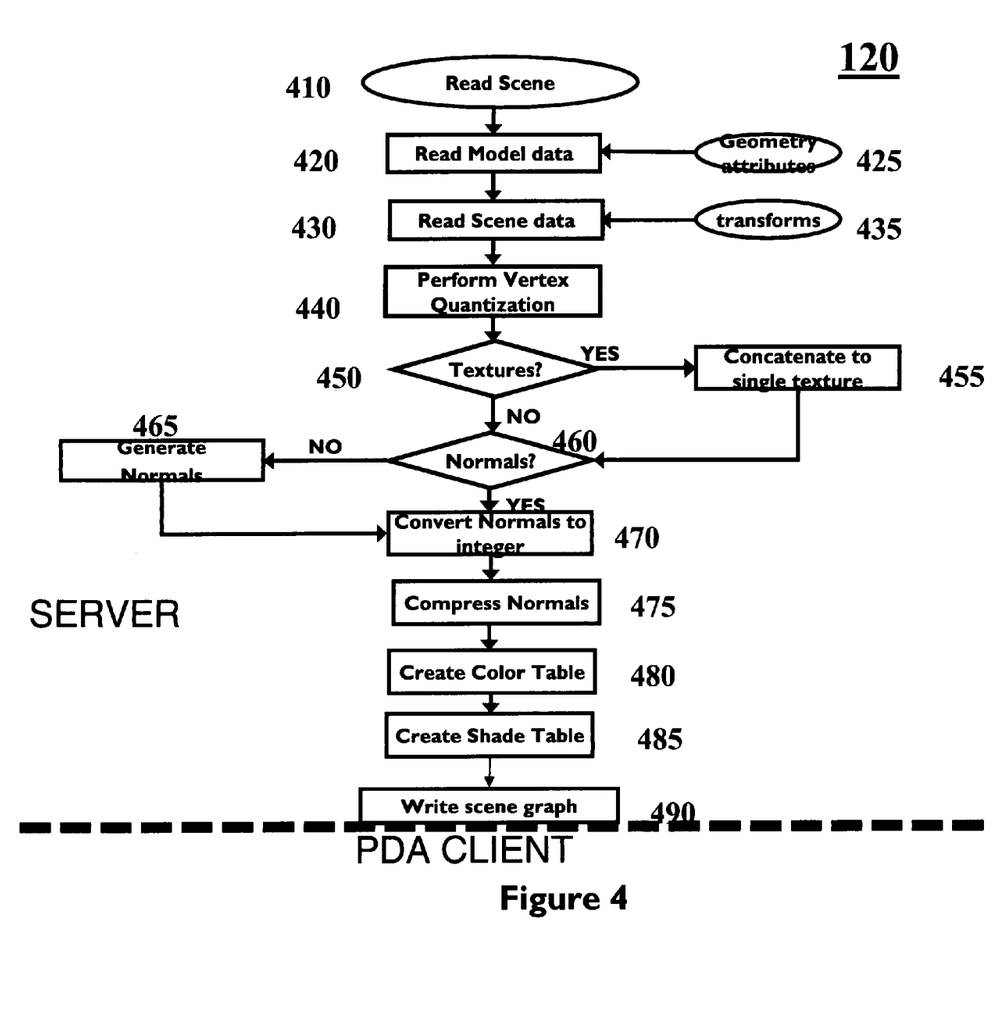
FIG. 4 is a flow chart of an overall transcoding process.

A preferred embodiment of these inventions uses the Transcoder process 120 described in FIG. 4 to produce a 3D scene in a format that is optimized for a low-power display device. The Transcoder 120 reads a generic (3D) scene file which may be specific to the application that created it or may utilize an industry standard such as, VRML or MPEG-4 BIFS and convert the scene file into a file format that is highly optimized for a low-power device.

Refer to FIG. 4 for a non-limiting example of the Transcoding process 120. In a preferred embodiment, two or more of the innovations used in combination in this invention are created by the Transcoder—the Shade table, 485, and a color table, 480. The Transcoder 120 may reside and perform its function on the server 110 and/or client (e.g., 130, 150, 160, typically 150) or the Transcoder function may be distributed between the server 110 and the client 150. For instance, the server 150 might produce the geometric information (e.g., positional information like vertex position) of the geometric object/model with associated color information (geometric data) and the client might produce the color 480 and/or shade 485 tables. In alternative embodiments, the server 110 would produce the geometric data and the color (shade) data and the client 150 would produce the shade (color) data, or portions thereof.

The Transcoding process, 120, begins with the input of a scene description file, 410, that may be represented in binary, text format, or any other appropriate format. The Transcoder reads the geometric model data, 420, from the scene including any geometric attributes, 425, such as vertex color or normal information (geometric data). This geometric data 425 is typically in the form of x, y, z vertex data and a set of integer 3-tuples representing triangles with each component of the 3-tuple being an index into the vertex coordinate list. This may also include color information such as, but not limited to, RGB values, texture coordinates, material properties, etc. In preferred embodiments, data describing the objects in the scene is read, 430, including modeling and viewing transformations, 435, required to position and orient the objects correctly. The modeling and viewing transformations may be represented as matrices or separate scale, translate parameters along each axis of the coordinate system. In preferred embodiments, vertices are quantized from floating point to fixed point, 440, which has the effect of reducing memory requirements, but also results in a loss of precision that is normally not viewable in the final rendered image. In preferred embodiments, any textures are read, 450, and concatenated into a single texture, 455. Optionally, if normals are used, normal information is read, 460, or generated, 465. If normals don't exist in the original model, but a normal binding was specified, the normals need to be generated. Normals preferably are then converted to fixed point, 470, and compressed, 475 resulting in a significantly smaller memory footprint.

Figure 2:
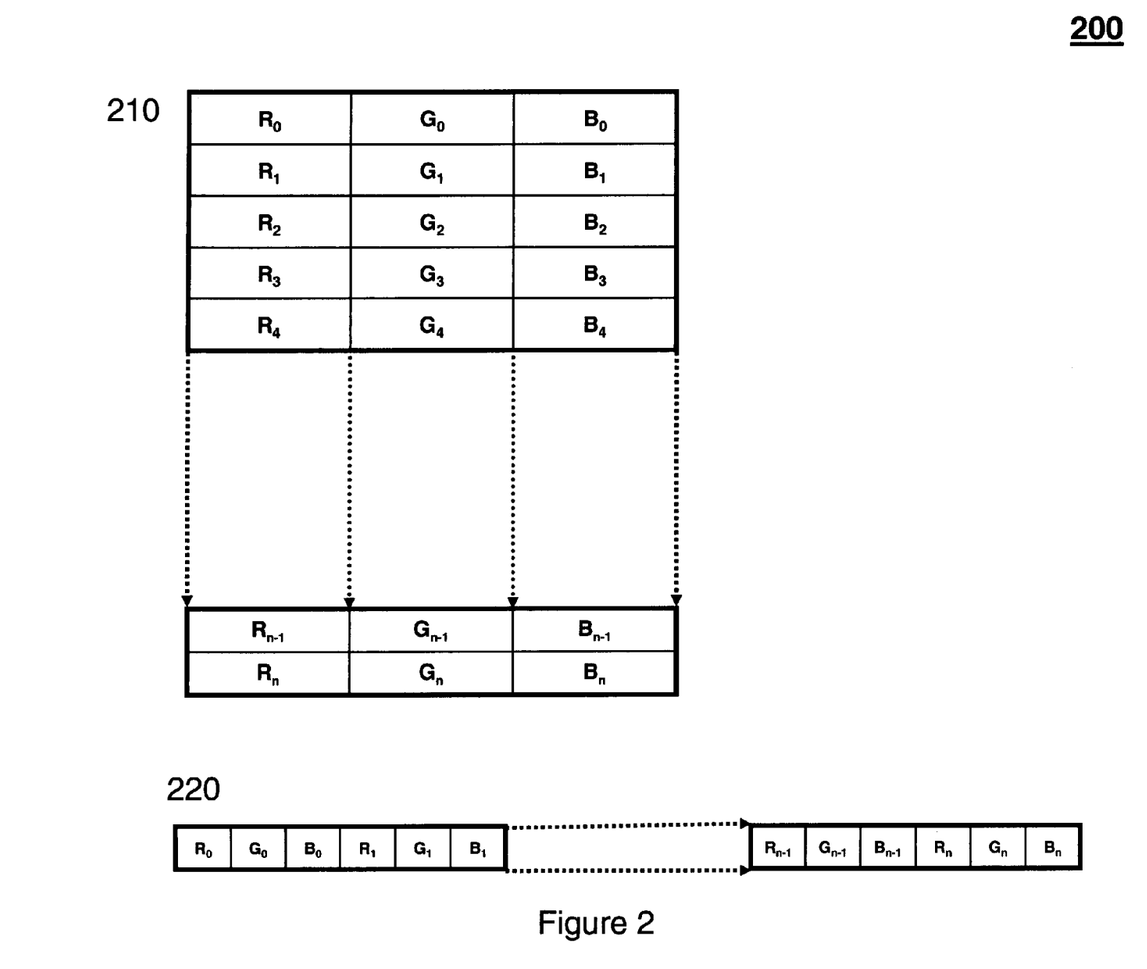
FIG. 2 is a block diagram of a color look up table data structure.

A novel color table, 480, is computed and all data is written to a scene file, 490. The color table 480 contains color attribute data such as R,G,B values which preferably smoothly transition to black 0,0,0 from the colors specified at each vertex of the triangles in the original 3D objects. FIG. 2 shows an example of a color table. The color table size is determined by the number of entries and the size of each entry. In this example, each entry is 3 bytes in length and there are 256 entries. Each entry consists of an R,G,B value each requiring 8-bits of memory. The 256 entries are determined by the depth of the devices framebuffer. For example, a device that has a framebuffer of 8-bits would only be able to represent values ranging from 0 to 255 (a range of 256 values). A framebuffer with 4-bits would only be able to store values from 0.15 (a range of 16). Low power devices tend to have limited framebuffer memory because (1) cost and (2) power requirements of refreshing more memory are prohibitive. The color table in FIG. 2, 210, is represented logically as a 2D array of values. In one preferred embodiment, this table is stored in memory as a linear 1D array of values, 220. The original color table is computed by sampling all the colors at each vertex in the geometric model and adding them to a buffer. In order to compensate for new colors that will be generated by the smooth shading process during rendering, combinations of the vertex colors for each polygon are computed. In one preferred embodiment, the color combination is a linear combination by computed weighted sums of the vertex colors to create a new fill color which is added to the color table. (Note however, that other combination schemes, e.g., not linear combinations, weighted or not, can be used.) The number of weighted sums is variable and is related to the number of fill shades one wants to predict for each polygon. In a preferred embodiment, this is somewhat arbitrary, but should be limited by the size of the polygon. For example, a polygon (e.g., a triangle) that would encompass an area of 16 pixels on a display device can't really have more than 16 shades of any color. After all these sample fill colors are added to the table, the table size is checked and if it exceeds 256 entries (or 2^(depth-1), where depth equals depth of framebuffer in bits), a quantization algorithm is applied to the table to reduce its size to 256 entries. In this implementation, a median-cut algorithm first proposed by Heckbert is used. Other known quantization algorithms can be used. In alternative preferred embodiments, these fill colors can be determined for any one or more changing object attributes, e.g., orientation, size, lighting, motion, and color.

A novel shade table 485 associates a substitute color with each of the fill colors. Therefore, when a first fill color is encountered in a rendering process, e.g., 145, a substitute color is substituted for the first fill color. The substitute color is substituted each time the first fill color is needed. In this sense the substitute color is unique because the substitute color will be the only color substituted for the first fill color. However, the substitute color also can be substituted for one or more second substitute colors. In this way at least two of the fill colors will have the same substitute color. Using this technique, a set of substitute colors is produced that is smaller than the set of fill colors and each fill color is assigned (uniquely) to one substitute color.

Figure 3:
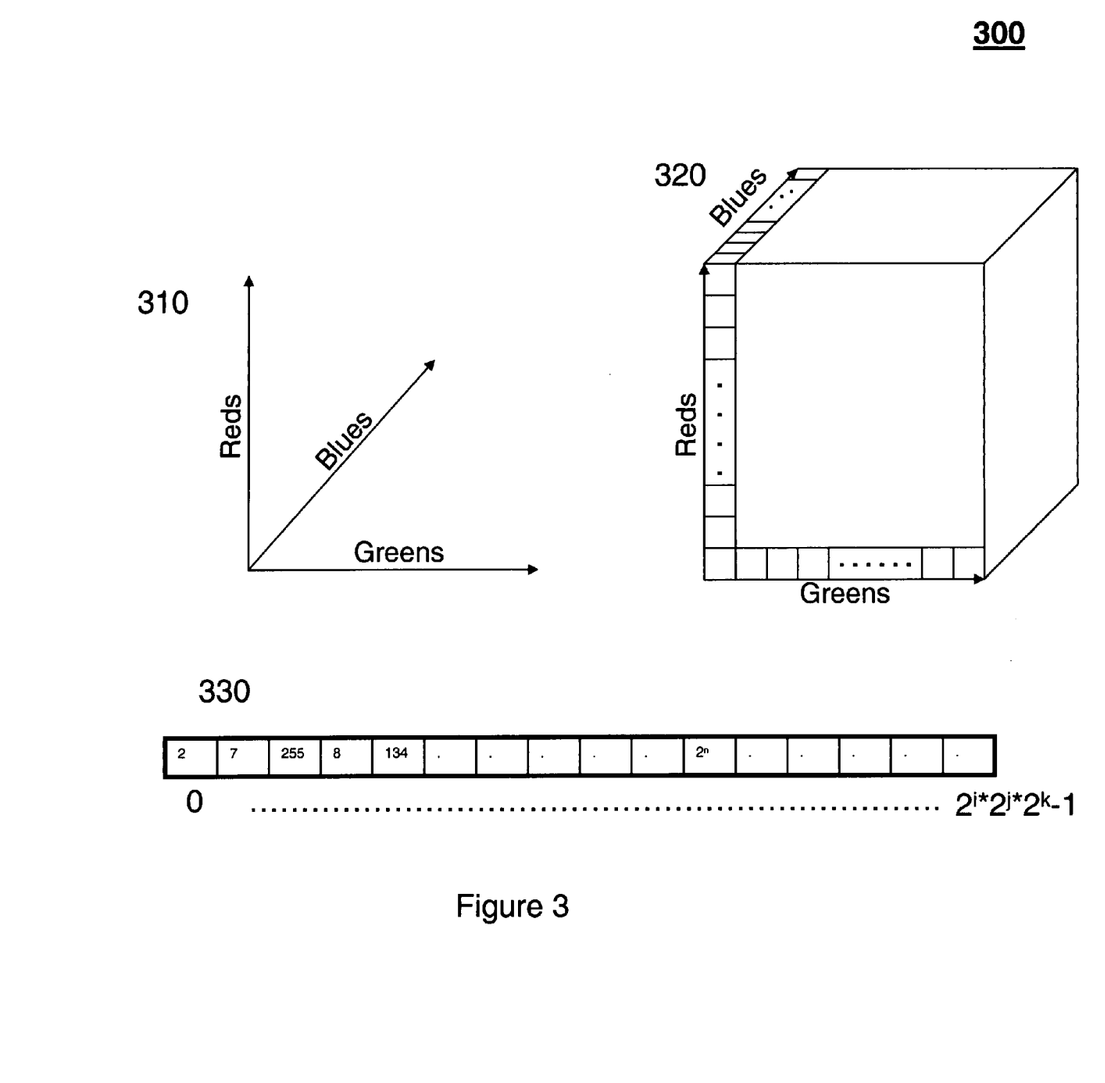
FIG. 3 is a block diagram of a shade table data structure.

FIG. 3 depicts an example of a preferred shade table as used in this invention. In 310, the 3 color axes are shown for R. G. B. A logical representation of the shadetable as a 3 dimensional cube 320 is shown. The number of elements and length of each element is determined by several factors. Each element stores a value which will be used as an index into the color table described in FIG. 2. Thus, there is a correlation between the size of the color table and the length of each element in the shade table. For example, if the color table is 256 entries long then the length of each element of the shade table must be 8-bits (2^8=256). The number of elements is a somewhat more complicated issue. The number of elements represents the product of the number of R, G, B values. For example, if there are 32 values each for R, G, and B then the size of the shade table would be 32*32*32 which equals 32,768. The user can decide how many values of R, G, and B they wish to represent based on how much memory will be available for storage of the shade table on the target device. They may also decide that the numbers of R, G, B elements should correspond to the distribution of R, G, B in the geometric scene that will be rendered. In this case, the shade table may have different length color axis. In all cases, each R,G,B triplet represented by each element of the shade table is mapped to a corresponding element of the color table by storing the index of the color in the color table into element in the shade table. In preferred embodiments, the substitute color is assigned to its respective fill color(s) because of a degree of closeness the colors have. In a preferred embodiment, the degree of closeness is determined by a color closeness algorithm.

In a preferred embodiment, this may be simple computing the distance (degree of closeness) between the current RGB value and each value in the color table until you have determined which RGB value in the table is a minimum distance from the current RGB value. Computing the minimum distance requires computing the difference between each component of the current RGB value and each component of each color stored in the color table, e.g. Rc–Ri, Gc–Gi, Bc–Bi. Next each difference is squared and than the squares are summed. Finally, the square root of the summed distances is computed. This number represents the distance between the current color and color I in the color table. This process computes the distance from the current color to each color in the color table starting with color at index 0 and proceeding to color at index N–1 where N represents the size of the color table. For improved performance the square root of the summed differences need not be taken because it does not change the relative distance between one color and the next in the color table and the current color.

Figure 5:
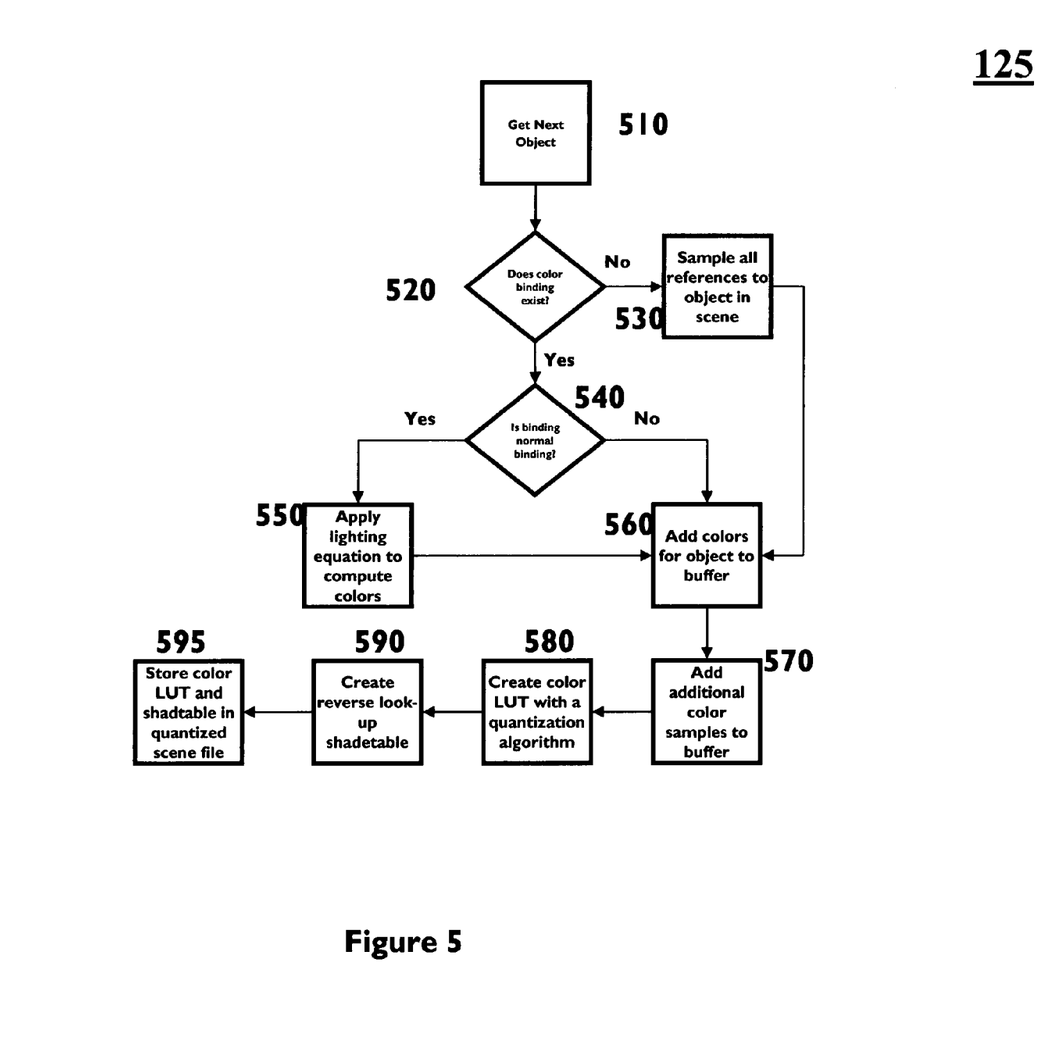
FIG. 5 is a flow chart of color table creation process.

The color 480 and shade 485 table creation process is detailed in FIG. 5, 125. This process ideally executes within the Transcoder, shown in FIG. 4, 480, 485. As stated above it is possible to distribute the Transcoder function between the server 110 and the client 150. It is also possible for the color table and shade table to be created on the display device. In some embodiments, this implementation uses an offline process executing on a server.

Refer to FIG. 5, the color table creation process 125. Each (3D) geometric object is sampled, 510, and it is determined whether a color binding exists, 520. Color bindings represent whether attributes are present for each unique vertex or each unique corner of a triangle. If there is not a color binding, all references to the object in the scene are determined, 530, and all colors referenced within the object are added to a buffer, 560. No color binding means that the object is not intended to be smooth shaded rather it is flat shaded so there will be not color variations over its surface. An object may include a color per vertex or a color per corner which will signify a smooth shading operation. Additionally, an object may have a normal per vertex or normal per corner which signifies a smooth shading and a lighting operation. If a normal binding is indicated, 540, then a lighting equation is applied to the object, 550, to compute the colors at the vertices.

The computed colors are added to a color buffer in memory, 560. After this process has been completed for all objects in the scene, additional colors are added to the color buffer, 570, to create a smooth transition to black represented by RGB value of 0,0,0. The additional colors represent colors at internal pixels which can be randomly selected or selected using some statistical distribution such as a Poisson function, stochastic sampling, an exponential function, a Chi squared function, an F squared function, a T function, and Gausssian function. Using a color quantization algorithm, the color table is quantized, 580, to a size that can be accommodated by the client display device. This may vary from device to device and it is possible that several color tables can be created and stored in the scene the one best matching the display device being used. The color table may be created with any color quantization algorithm such as the median-cut algorithm proposed by Heckbert or "Color Image Quantization by Minimizing the Maximum Intercluster Distance" proposed by Zhigang Xiang. It is important that the colors sampled for the color table not only represent colors at the vertices, but also colors that may be generated during the smooth shading process. These additional samples can be generated by computing the partial rates of change of each color component for a triangle and performing a sample scan conversion of the triangle to generate samples for interior triangle pixels. In one preferred implementation we chose to simple create a color ramp from a vertex color down to black and add this to the table of colors to be quantized for the color table. The samples taken for the creation of the color look-up table considered the color binding that would be used for each triangle, i.e. a triangle had no binding, color per triangle, color per vertex, or color per corner binding types. By taking binding type into account, the appropriate distribution of sample colors was taken for the entire 3D scene.

The next step is to create a reverse look-up shade table that can be used to quickly look-up the nearest color stored in the color table. The reverse look-up shade table is created by sampling some predetermined, user adjustable number of R,G,B values, finding the closest color in the color look-up table and storing the index of that color in the shade table. In a preferred embodiment, both the shade table and the color look-up table are stored in the Transcoded scene file to be transferred to the low-power handheld device.

In a preferred embodiment, the shade table, 590, is created by generating permutations of R,G,B values. The shade table is computed by first selecting the number of discrete values we want to represent along each color axis—R, G, and B. This is in turn dependent on how much memory we want to allocate for the shade table. For example, if we only want to allocate 32K, then we could have 32 R values, 32 G values, and 32 B values. We could distribute differently if we determined that our final image would be predominantly Red or Green or Blue. This is also an implementation detail that depends on several factors, for example, client device memory constraints.

Figure 6:
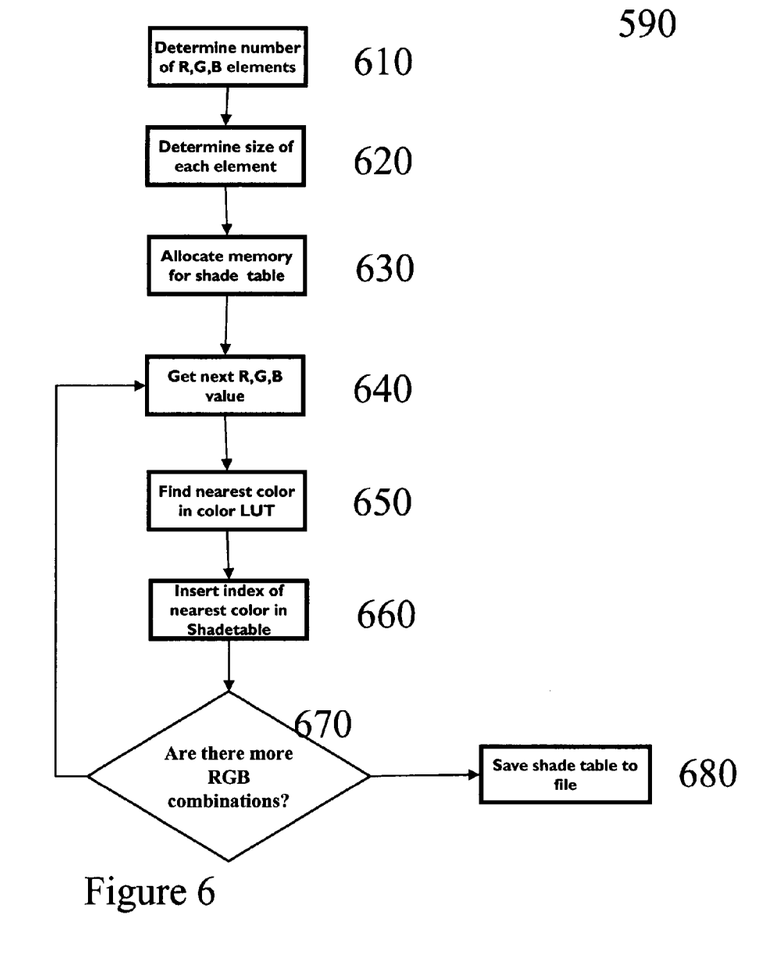
FIG. 6 shade table creation process.

FIG. 6, the shade table creation process, describes in better detail the creation of the color table and the Shade table. Note, that in 610 the number of R,G,B elements along each axis of the shade table is first determined. This is dependent on the amount of available memory on the target device for storage of the shade table as well as other factors such as the distribution of each R,G,B components in the scene, the projected variation of shades based on the average size of the polygons in the scene which can be represented as area and pre-computed. In 620, the size of each element is computed. This is directly related to the size of the color table. The shade table must be able to store values that can be used as indices into the color table so if the color table is 256 entries the shade table must be able to store a value up to 255. After memory for the table is allocated, 630, each combination of R,G, B is mapped to the nearest value 650 in the previously created color table and the index of that value is stored 660 in the R,G,B entry of the Shade table. This mapping is performed by any known "best fit algorithm" or "degree of closeness algorithm" like the vector distance algorithm described above. Mapping can also be done by: a close color matching algorithm, an RGB value comparison, and an RGB variance matching scheme. This process continues 640, until there are not remaining R,G,B combinations, then the shade table is stored 680 in the scene file with the previously created color table.

Figure 7:
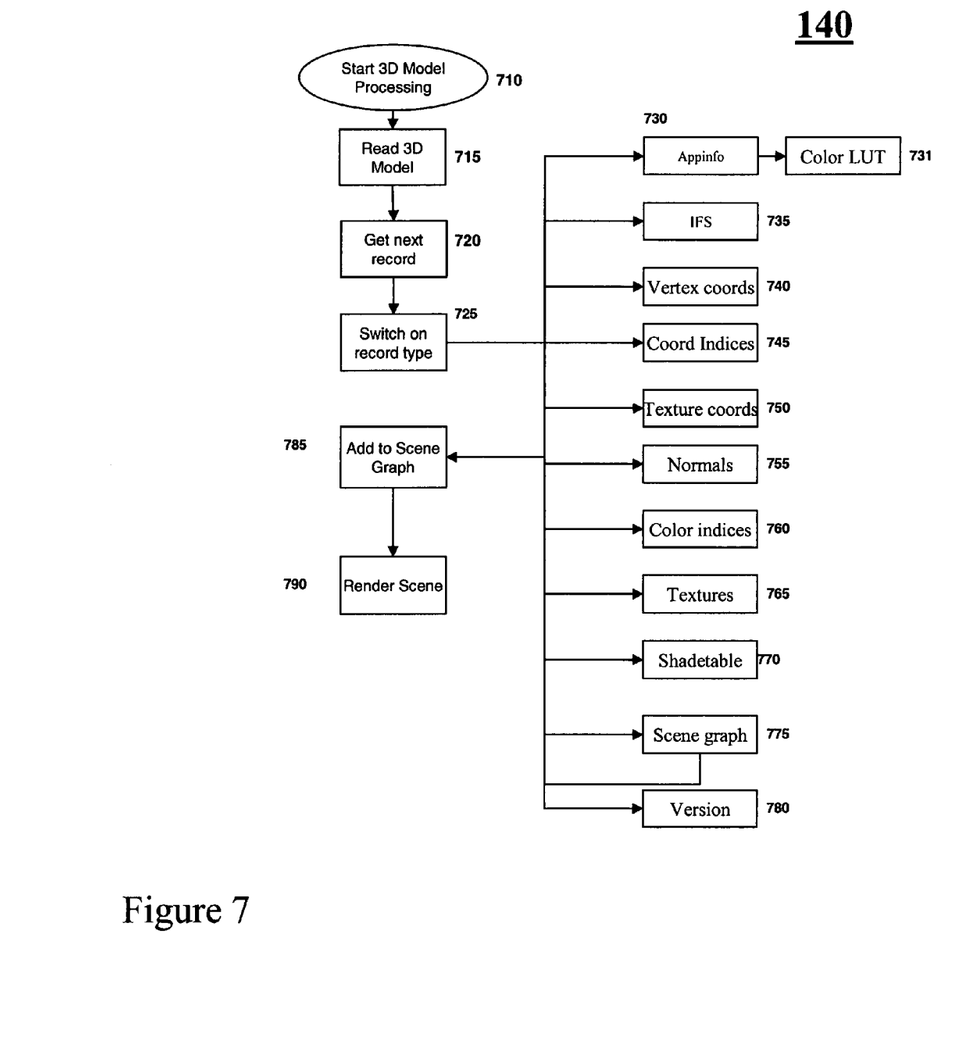
FIG. 7 is a flow chart of a client parser process.

FIG. 7 describes the client parsing process. The process is designed to read in a model 710, that has been transcoded by the process described previously in FIG. 4. After the model has been read by the client process, each data record stored in the model is accessed 720, and further processed based on type 725. The various record types are referenced in 730–780. The Color Table 731 and Shade Table 770 created by the processes described in FIGS. 5 and 6 are stored in the client devices internal memory in the preferred form of a tree data structure 785. The tables are used in the rendering process to substitute color table colors to fill colors generated by the smooth shading process. Once all records have been processed, the rendering process of smooth shading polygons 790 can begin.

Figure 8:
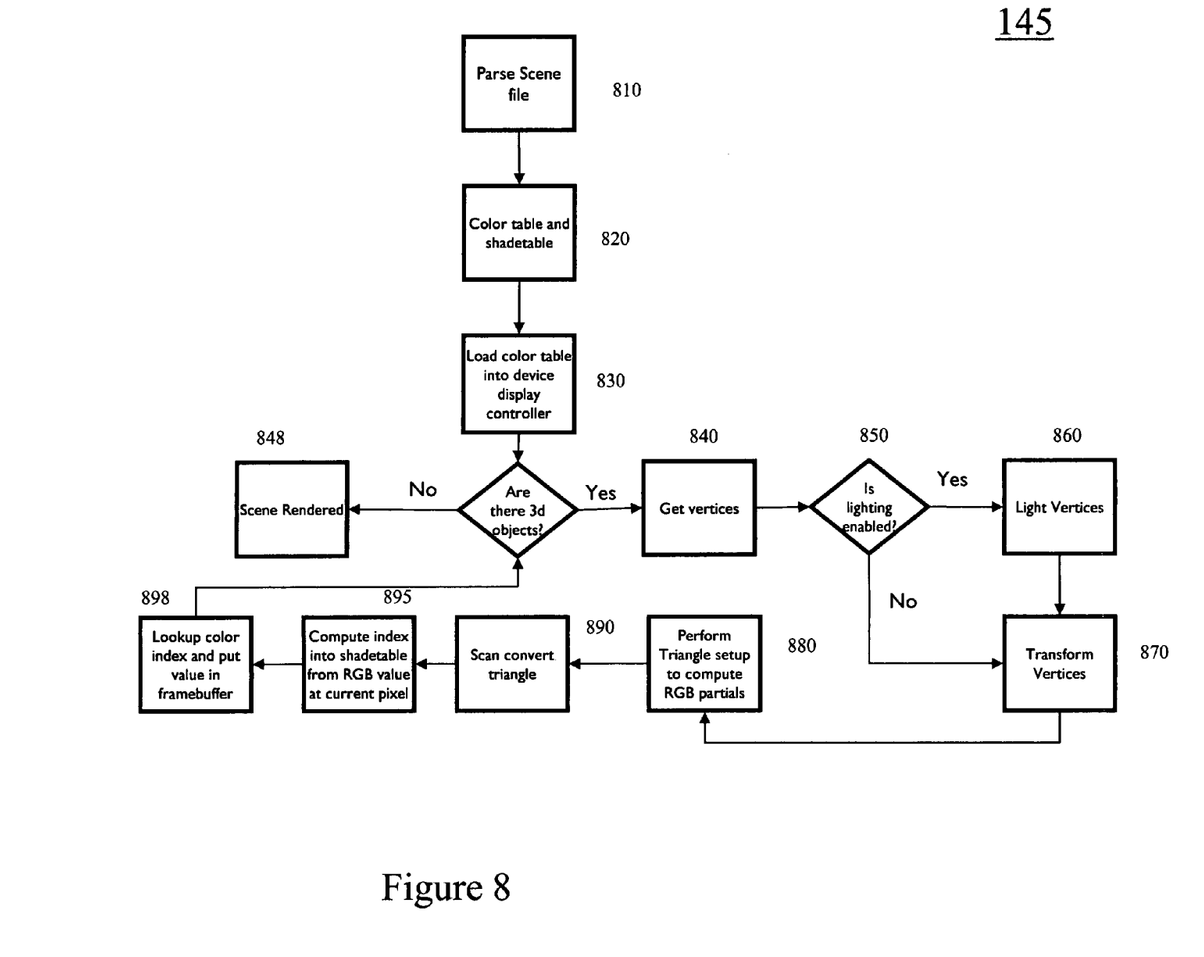
FIG. 8 is a flow chart of a rendering process.

The process of correlating fill colors in the Shade Table to substitute colors in the Color Table enables a rendering process, highlighted in FIG. 8, to render real-time lighting computations performed in 860 by generating new colors that may not have been in the original model and using a reduced set substitute colors to substitute for the required number of fill colors. In a preferred embodiment, the substitute colors will be distributed from the minimum R,G,B in the original sample toward 0,0,0.

Refer to FIG. 8. In a preferred embodiment, a renderer executes in real-time on the low power handheld device. The rendering process 145 reads and parses the Transcoded scene file created by the first process described above. The color look-up table and the shade table are stored 830 in the client's 150 application memory. During the rendering process, objects are transformed, lit, and shaded by the renderer application software. The software applies transformations to the vertices of each triangle, executes the lighting equation to compute colors at the vertices, and scan converts the resulting triangles to create a smooth shaded filled image in the display systems framebuffer memory. During the smooth shading step, vertex colors are represented by 8-bit per color channel values and are interpolated across the service of the triangle. At each pixel location, the current color is computed using interpolation and the least significant bits (5-bits in our implementation) from each color (R, G, B) are used to compute an index value into the color map thereby selecting the closest color value to the generated smooth shaded color FIG. 8 details the rendering process including the use of the shade table. The object vertices, 840 are rendered by lighting the vertices of each triangle in each object, 860, transforming the vertices, 870, performing a triangle setup step, 880, during which the rates of change of the R, G, B color components across a triangle surface are computed, scan converting, 890, each triangle applying a smooth shading algorithm to compute color information for interior pixels. The shading algorithm uses the reverse look-up shade table, 895, created by the transcoder to quickly select a color from the color table, 898, that is closest to the generated color from the smooth shading process and inserts the index of the color into the framebuffer, 899.

We claim:

1. A computer graphics system having one or more central processing units (CPUs), one or more memories, and one or more communication interface, the system further comprising:
    a geometric data structure having a plurality of vertex positions defining one or more polygons, the polygons defining a wireframe representation of a geometric object, each of the vertex positions further associated with one or more sets of vertex color information;
    a color table data structure having one or more fill colors to be rendered between two or more of the vertex positions on a rendering of the geometric object; and
    a shade table data structure that associates a substitute color to each of the fill colors, at least two of the fill colors having the same substitute color.

2. A computer graphics system having one or more central processing units (CPUs), one or more memories, and one or more communication interface, the system further comprising:
    a geometric data structure having a plurality of vertex positions defining one or more polygons, the polygons defining a wireframe representation of a geometric object, each of the vertex positions further associated with one or more sets of vertex color information;
    a color table data structure having one or more fill colors to be rendered between two or more of the vertex positions on a rendering of the geometric object;
    a color table process that determines the fill colors and stores the fill colors in the color table data structure; and
    a shade table data structure that associates a substitute color to each of the fill colors, at least two of the fill colors having the same substitute color.

3. A system, as in claim 2, where the color table process determines the fill colors as being a set of colors that uniformly varies from a vertex color to a final color.

4. A system, as in claim 3, where the final color has red, green, and blue values of 0,0,0 respectively.

5. A system, as in claim 2, where color table process determines the fill colors randomly.

6. A system, as in claim 2, where the color table process determines the fill colors associated with one or more interior surfaces of one or more of the polygons with a statistical distribution function.

7. A system, as in claim 6, where the statistical distribution function includes any one or more of the following: a Poisson function, stochastic sampling, exponential, Chi squared, F squared, T, and Gausssian.

8. A system, as in claim 2, where a set of the substitute colors are a set that is supported by a rendering device.

9. A system, as in claim 2, where one or more of the substitute color is closest to the respective associated fill color within a degree of closeness.

10. A system, as in claim 9, where the degree of closeness is measured by one or more of the following: a close color matching algorithm, an RGB value comparison, and an RGB variance matching scheme.

11. A system, as in claim 2, being a server that transmits the geometric data structure, the color table data structure, and the shade table data structure over the communication interface.

12. A system, as in claim 2, being a client that receives the geometric data structure and further comprises a color generator that produces a color table data structure and a shade table data structure.

13. A system, as in claim 2, being a client that receives the geometric data structure and a color table data structure and further comprises a color generator that produces a shade table data structure.

14. A system, as in claim 2, being a client that receives the geometric data structure, a color table data structure, and a shade table data structure.

15. A client system, as in claim 2, where the vertex color information is any one or more of the following: a normal vector, a light source, an RGB value, a texture coordinate value, a procedural color generator.

16. A client system, as in claim 2, where the shading process is one of the following: Gouraud, Phong, and a smooth shading process.

17. A client computer graphics system having one or more central processing units (CPUs), one or more memories, and one or more communication interface, the system further comprising:
    a geometric data structure having a plurality of vertex positions defining one or more polygons, the polygons defining a wireframe representation of a geometric object, each of the vertex positions further associated with one or more sets of vertex color information;
    a color table data structure having one or more fill colors to be render between two or more of the vertex positions on a rendering of the geometric object;
    a shade table data structure that associates a substitute color to each of the fill colors, at least two of the fill colors having the same substitute color;
    one or more rendering devices; and
    a shading process for rendering a shaded geometric object on the rendering device, the shaded geometric object being the geometric object shaded with a shading between the vertex positions, the shading being only colored with a subset of the fill colors.

18. A client computer, as in claim 17, where the client computer is one or more of the following: a phone, a cell phone, a portable computer, a personal digital assistant (PDA), and a game.

19. A client computer, as in claim 17, where the shaded geometric object is rendered with image artifacts such as Moire patterns.

20. A client computer, as in claim 19, where the pixel colors arbitrarily transition to black.

21. A client computer, as in claim 17, where the shaded geometric object changes one or more object attributes and where the shading changes with the changing object attributes, but where the shading is only colored with a subset of the fill colors.

22. A client computer, as in claim 21, where the object attributes include any one or more of the following: a lighting, an orientation, a size, a motion, and one or more colors.

23. A computer graphics article of manufacturer having one or more central processing units (CPUs), one or more memories, and one or more communication interface, the article further comprising:
    a geometric data structure having a plurality of vertex positions defining one or more polygons, the polygons defining a wireframe representation of a geometric object, each of the vertex positions further associated with one or more sets of vertex color information;

a color table data structure having one or more fill colors to be render between two or more of the vertex positions on a rendering of the geometric object;

a shade table data structure that associates a substitute color to each of the fill colors, at least two of the fill colors having the same substitute color;

one or more rendering devices; and a shading process for rendering a shaded geometric object on the rendering device, the shaded geometric object being the geometric object shaded with a shading between the vertex positions, the shading being only colored with a subset of the fill colors.

24. A computer graphics method comprising the steps of:

storing a geometric data structure in a memory, the geometric data structure having a plurality of vertex positions defining one or more polygons, the polygons defining a wireframe representation of a geometric object, each of the vertex positions further associated with one or more sets of vertex color information;

determining one or more fill colors to be rendered between two or more of the vertex positions on a rendering of the geometric object; and associating a substitute color to each of the fill colors, at least two of the fill colors having the same substitute color.

25. A computer graphics system comprising:

means for storing a geometric data structure in a memory, the geometric data structure having a plurality of vertex positions defining one or more polygons, the polygons defining a wireframe representation of a geometric object, each of the vertex positions further associated with one or more sets of vertex color information;

means for determining one or more fill colors to be rendered between two or more of the vertex positions on a rendering of the geometric object; and means for associating a substitute color to each of the fill colors, at least two of the fill colors having the same substitute color.

* * * * *